(12) United States Patent
Lee et al.

(10) Patent No.: US 11,978,846 B2
(45) Date of Patent: May 7, 2024

(54) SOLID ELECTROLYTE MEMBRANE AND SOLID-STATE BATTERY COMPRISING THE SAME

(71) Applicant: LG CHEM, LTD., Seoul (KR)

(72) Inventors: Jung-Pil Lee, Daejeon (KR); Sung-Joong Kang, Daejeon (KR); Eun-Bee Kim, Daejeon (KR); Ji-Hoon Ryu, Daejeon (KR); Suk-Woo Lee, Daejeon (KR); Jae-Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 815 days.

(21) Appl. No.: 17/056,683

(22) PCT Filed: Jun. 14, 2019

(86) PCT No.: PCT/KR2019/007235
§ 371 (c)(1),
(2) Date: Nov. 18, 2020

(87) PCT Pub. No.: WO2019/240547
PCT Pub. Date: Dec. 19, 2019

(65) Prior Publication Data
US 2021/0367263 A1 Nov. 25, 2021

(30) Foreign Application Priority Data

Jun. 15, 2018 (KR) .................. 10-2018-0069240
Dec. 21, 2018 (KR) .................. 10-2018-0167864

(51) Int. Cl.
*H01M 10/056* (2010.01)
*H01M 4/38* (2006.01)
(Continued)

(52) U.S. Cl.
CPC ......... *H01M 10/056* (2013.01); *H01M 4/382* (2013.01); *H01M 4/622* (2013.01);
(Continued)

(58) Field of Classification Search
CPC .... H01M 10/056; H01M 4/382; H01M 4/622; H01M 4/628; H01M 10/0525;
(Continued)

(56) References Cited

U.S. PATENT DOCUMENTS

2001/0008732 A1   7/2001   Hikmet
2013/0143128 A1*  6/2013   Mochida ........... H01M 10/0585
                                                              427/78
(Continued)

FOREIGN PATENT DOCUMENTS

CN   103098288 A   5/2013
CN   112544007 A   3/2021
(Continued)

OTHER PUBLICATIONS

Dörr et al., "An Ambient Temperature Electrolyte with Superior Lithium Ion Conductivity based on a Self-Assembled Block Copolymer," Chem. Eur. J., vol. 24, 2018, pp. 8061-8065.
(Continued)

*Primary Examiner* — Michael L Dignan
(74) *Attorney, Agent, or Firm* — Birch, Stewart, Kolasch & Birch, LLP

(57) ABSTRACT

A solid electrolyte membrane for a solid-state battery and a battery comprising the same is provided. The battery may comprise lithium metal as a negative electrode active material. The solid electrolyte membrane comprises an inhibiting layer, which is preferably capable of inhibiting growth of lithium dendrite, because it includes an effective amount of a dendrite growth-inhibiting material, which is capable of ionizing lithium deposited in the form of metal. Thus, when
(Continued)

lithium metal is used as a negative electrode for a solid-state battery comprising the solid electrolyte membrane, it is possible to delay and/or inhibit growth of lithium dendrite, and thus to effectively prevent an electrical short-circuit caused by dendrite growth.

15 Claims, 4 Drawing Sheets

(51) Int. Cl.
  *H01M 4/62* (2006.01)
  *H01M 10/0525* (2010.01)
(52) U.S. Cl.
  CPC ....... *H01M 4/628* (2013.01); *H01M 10/0525* (2013.01); *H01M 2300/0071* (2013.01); *H01M 2300/0082* (2013.01); *H01M 2300/0094* (2013.01)
(58) Field of Classification Search
  CPC . H01M 2300/0071; H01M 2300/0082; H01M 2300/0094; H01M 2300/0068; H01M 2300/0091; H01M 10/4235; H01M 10/052; H01M 10/0562; H01M 10/0565
  See application file for complete search history.

(56) References Cited

U.S. PATENT DOCUMENTS

| | | | |
|---|---|---|---|
| 2013/0202920 A1* | 8/2013 | Xu | H01M 10/0568 429/188 |
| 2015/0047767 A1 | 2/2015 | Sano | |
| 2015/0056488 A1 | 2/2015 | Zhang et al. | |
| 2015/0111110 A1 | 4/2015 | Watanabe | |
| 2015/0155592 A1* | 6/2015 | Pratt | H01M 4/485 429/315 |
| 2016/0149267 A1 | 5/2016 | Badding et al. | |
| 2016/0344035 A1 | 11/2016 | Zhamu et al. | |
| 2017/0092983 A1 | 3/2017 | Pratt et al. | |
| 2017/0263977 A1 | 9/2017 | Jeon et al. | |
| 2017/0324097 A1 | 11/2017 | Lee et al. | |
| 2018/0123181 A1 | 5/2018 | Son et al. | |
| 2018/0166759 A1* | 6/2018 | Zhamu | H01M 10/056 |
| 2020/0127293 A1 | 4/2020 | Son et al. | |
| 2021/0288354 A1* | 9/2021 | Lee | H01M 50/431 |
| 2022/0052418 A1* | 2/2022 | Lee | H01M 10/4235 |
| 2022/0200097 A1* | 6/2022 | Lee | H01M 10/0562 |

FOREIGN PATENT DOCUMENTS

| | | | |
|---|---|---|---|
| EP | 3 428 998 A1 | | 1/2019 |
| EP | 3 439 096 A1 | | 2/2019 |
| EP | 3 838 274 A1 | | 6/2021 |
| JP | 7-169507 A | | 7/1995 |
| JP | 2002-500813 A | | 1/2002 |
| JP | 2008-251219 A | | 10/2008 |
| JP | 2013-232284 A | | 11/2013 |
| JP | 2016-91856 A | | 5/2016 |
| JP | 2017-536678 A | | 12/2017 |
| KR | 10-2017-0105283 A | | 9/2017 |
| KR | 10-2017-0111439 A | | 10/2017 |
| KR | 10-2017-0126404 A | | 11/2017 |
| KR | 10-2018-0032168 A | | 3/2018 |
| KR | 10-2018-0046693 A | | 5/2018 |
| KR | 10-2018-0063148 A | | 6/2018 |
| KR | 10-2018-0076709 A | | 7/2018 |
| KR | 10-2019-0129768 A | | 11/2019 |
| WO | WO 2012/026480 A1 | | 3/2012 |
| WO | WO 2018/056615 A1 | | 3/2018 |
| WO | WO 2018183771 | * | 10/2018 ........ H01M 10/0562 |
| WO | WO 2020/214010 A1 | | 10/2020 |

OTHER PUBLICATIONS

International Search Report (PCT/ISA/210) issued in PCT/KR2019/007235, dated Sep. 23, 2019.
Shimizu et al., "Suppressing the effect of lithium dendritic growth by the addition of magnesium bis(trifluoromethanesulfonyl)amide," Phys. Chem. Chem. Phys., vol. 20, 2018, pp. 1127-1133.
European Search Report for Appl. No. 19820620.3 dated Jul. 14, 2021.
Chung et al., Mechanical and Thermal Failure Induced by Contact between a Li1.5Al0.5Ge1.5(PO4)3 Solid Electrolyte and Li Metal in an All Solid-State Li Cell, Chem. Mater., Oct. 3, 2017, 9 pages.
Wenzel et al., "Interphase formation on lithium solid electrolytes—An in situ approach to study interfacial reactions by photoelectron spectroscopy", Solid State Ionics, vol. 278, 2015, pp. 98-105.

* cited by examiner

FIG. 1 – Prior Art
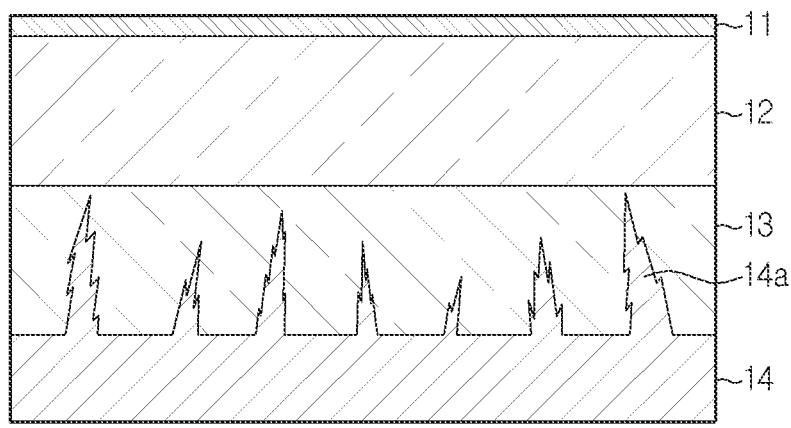
FIG. 2
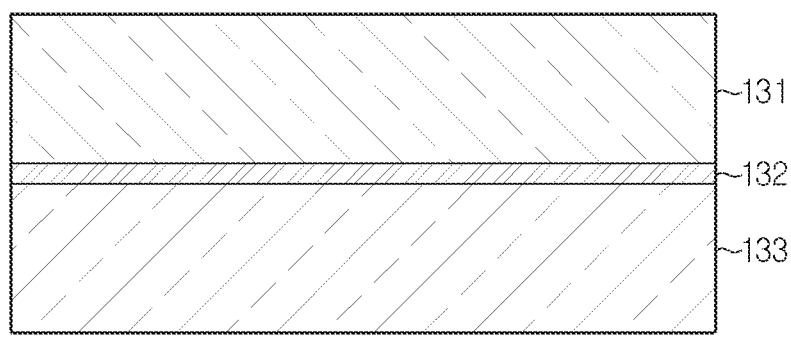

330

331
332
333

SOLID ELECTROLYTE MEMBRANE AND SOLID-STATE BATTERY COMPRISING THE SAME

TECHNICAL FIELD

The present application claims priority to Korean Patent Application No. 10-2018-0069240 filed on Jun. 15, 2018 and Korean Patent Application No. 10-2018-0167864 filed on Dec. 21, 2018 in the Republic of Korea. The present disclosure relates to a solid electrolyte membrane for a solid-state battery and a battery comprising the same. The present disclosure also relates to a solid-state battery comprising lithium metal as a negative electrode active material.

BACKGROUND ART

A lithium ion battery using a liquid electrolyte has a structure in which a negative electrode and a positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

The solid electrolyte may comprise a polymeric material made of an ion conductive material, or an inorganic material such as ion conductive oxide or sulfide. In addition, hybrid-type materials comprising a polymeric material mixed with an inorganic material has been suggested.

Meanwhile, when lithium metal is used as a negative electrode active material, there is a problem in that lithium dendrite is grown from the negative electrode surface and the grown lithium dendrite causes a short-circuit in a battery when it is in contact with a positive electrode. FIG. 1 is a schematic view illustrating a conventional solid-state battery. In such a solid-state battery, a solid electrolyte membrane functions as an electrical insulator for positive/negative electrodes, instead of a separator. However, when a polymeric material is used as a solid electrolyte, it may be damaged due to the growth of lithium dendrite. FIG. 1 shows a conventional solid-state battery using a solid electrolyte and schematically illustrates a mechanism of short-circuit generation caused by the growth of lithium dendrite 14a. The solid-state battery as shown in FIG. 1 comprises a positive electrode active material layer 12 formed on the surface of a current collector 11, and the positive electrode active material layer is stacked on a negative electrode 14 by means of a solid electrolyte layer 13. In such a solid-state battery, lithium dendrite 14a may be grown at the negative electrode in the vertical direction after using the battery, and the solid electrolyte layer 13 may be damaged by lithium dendrite and finally is in contact with the positive electrode, resulting in a short-circuit. In addition, an inorganic solid electrolyte is generally formed in a layered structure by integrating particle-shaped ion conductive inorganic materials, and comprises a plurality of pores due to the interstitial volumes among the particles. Therefore, lithium dendrite may be grown in the spaces provided by the pores and lithium dendrite grown through the pores may be in contact with the positive electrode, resulting in a short-circuit. Under these circumstances, there is a need for developing an electrolyte membrane for a solid-state battery which can inhibit growth of lithium dendrite.

DISCLOSURE

Technical Problem

The present disclosure is designed to solve the problems of the related art, and therefore the present disclosure is directed to providing a solid electrolyte membrane for a solid-state battery which inhibits growth of lithium dendrite. The present disclosure is also directed to providing a solid-state battery comprising lithium metal as a negative electrode active material. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a solid electrolyte membrane for a solid-state battery which can solve the above-mentioned technical problems. According to the first embodiment of the present disclosure, there is provided a solid electrolyte membrane for a solid-state battery which has an ion conductivity of $1 \times 10^{-7}$ S/cm or more and comprises at least one inhibiting layer comprising a dendrite growth-inhibiting material (a); and the dendrite growth-inhibiting material (a) is derived from any one of (a1) metal(s) having lower ionization tendency as compared to lithium, and (a2) alloy(s) of two or more of the above-mentioned metals, and is comprised in the inhibiting layer in at least one form of a salt thereof and ion thereof.

According to the second embodiment of the present disclosure, there is provided the solid electrolyte membrane for a solid-state battery as defined in the first embodiment, wherein the inhibiting layer is patterned with a plurality of pattern units comprising the inhibiting material, and the pattern units are distributed regularly or randomly in the inhibiting layer.

According to the third embodiment of the present disclosure, there is provided the solid electrolyte membrane for a solid-state battery as defined in the second embodiment, wherein the inhibiting layer comprises a dendrite growth-inhibiting material (a) and a copolymer to which the inhibiting material is chemically bound, has a micropattern derived from the self-assemblage of the copolymer; and the copolymer comprises a functional group capable of being bound chemically with the inhibiting material and the inhibiting material is bound with the copolymer by means of the functional group.

According to the fourth embodiment of the present disclosure, there is provided the solid electrolyte membrane for a solid-state battery as defined in the second or the third embodiment, wherein the inhibiting layer has a shape comprising micelles aligned in a hexagonal close-packed structure by the self-assemblage of the copolymer.

According to the fifth embodiment of the present disclosure, there is provided the solid electrolyte membrane for a solid-state battery as defined in any one of the second to the fourth embodiments, wherein the functional group comprises at least one of ether and amine.

According to the sixth embodiment of the present disclosure, there is provided the solid electrolyte membrane for a solid-state battery as defined in any one of the second to the fifth embodiments, wherein the copolymer comprises at least one selected from polystyrene-block-poly(2-vinylpyridine) copolymer, polystyrene-block-poly(4-vinylpyridine) copolymer, poly(1,4-isoprene)-block-polystyrene-block-poly(2-vinylpyridine) copolymer and polystyrene-block-poly(ethylene oxide) copolymer.

According to the seventh embodiment of the present disclosure, there is provided the solid electrolyte membrane for a solid-state battery as defined in any one of the first to the sixth embodiments, wherein the metal comprises at least one selected from the group consisting of K, Sr, Ca, Na, Mg, Be, Al, Mn, Zn, Cr(+3), Fe, Cd, Co, Ni, Sn, Pb, Cu, Hg, Ag, Pd, Ir, Pt(+2), Au and Pt(+4).

According to the eighth embodiment of the present disclosure, there is provided the solid electrolyte membrane for a solid-state battery as defined in any one of the first to the seventh embodiments, wherein the inhibiting material comprises at least one selected from the group consisting of Au and Pt.

According to the ninth embodiment of the present disclosure, there is provided the solid electrolyte membrane for a solid-state battery as defined in any one of the first to the eighth embodiments, wherein the metal salt comprises at least one of chloride, iodide, cyanide, bromide, sulfide, hydroxide, phosphite and chloride hydrate.

According to the tenth embodiment of the present disclosure, there is provided the solid electrolyte membrane for a solid-state battery as defined in any one of the first to the ninth embodiments, which comprises two or more solid electrolyte layers and one or more inhibiting layer, wherein the inhibiting layer is disposed between the solid electrolyte layers.

According to the eleventh embodiment of the present disclosure, there is provided the solid electrolyte membrane for a solid-state battery as defined in the tenth embodiment, which comprises a first solid electrolyte layer, an inhibiting layer and a second solid electrolyte layer, stacked successively.

According to the twelfth embodiment of the present disclosure, there is provided the solid electrolyte membrane for a solid-state battery as defined in the tenth or the eleventh embodiment, wherein at least one of the solid electrolyte layers comprises the inhibiting material, and the content (wt %) of the inhibiting material in each solid electrolyte layer is smaller than that of the inhibiting material comprised in the inhibiting layer.

According to the thirteenth embodiment of the present disclosure, there is provided the solid electrolyte membrane for a solid-state battery as defined in any one of the first to the twelfth embodiments, which comprises an ion conductive solid electrolyte material, and the ion conductive solid electrolyte material comprises a polymeric solid electrolyte, an inorganic solid electrolyte or a mixture thereof.

According to the fourteenth embodiment of the present disclosure, there is provided the solid electrolyte membrane for a solid-state battery as defined in the thirteenth embodiment, wherein the polymeric solid electrolyte comprises a polymer resin and a solvated lithium salt.

According to the fifteenth embodiment of the present disclosure, three is provided an electrochemical device which is a solid-state battery comprising a negative electrode, a positive electrode and a solid electrolyte membrane interposed between the negative electrode and the positive electrode, wherein the negative electrode comprises lithium metal and the solid electrolyte membrane is the same as defined in any one of the first to the fourteenth embodiments.

According to the sixteenth embodiment of the present disclosure, there is provided the electrochemical device as defined in the fifteenth embodiment, wherein the solid electrolyte membrane comprises a first solid electrolyte layer, an inhibiting layer and a second solid electrolyte layer, stacked successively, the first solid electrolyte layer comprises an inhibiting material (a), and the inhibiting material is derived from any one of (a1) metal(s) having lower ionization tendency lower as compared to lithium, and (a2) alloy(s) of two or more of the above-mentioned metals.

Advantageous Effects

The solid-state battery according to the present disclosure comprises an inhibiting layer comprising an inhibiting material capable of inhibiting growth of lithium dendrite, and thus has an effect of ionizing lithium deposited in the form of metal and inhibiting growth of lithium dendrite. Therefore, when lithium metal is used as a negative electrode for a solid-state battery comprising the solid electrolyte membrane, it is possible to delay and/or inhibit growth of lithium dendrite, and thus to prevent an electrical short-circuit caused by dendrite growth effectively. In addition, the inhibiting layer may have a micropattern formed by the self-assemblage of a polymeric material, and thus causes no degradation of ion conductivity, while effectively carrying out a function of inhibiting growth of lithium dendrite.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

FIG. 1 is a schematic view illustrating the problem of a short-circuit caused by growth of lithium dendrite from a negative electrode in a conventional solid-state battery.

FIG. 2 is a schematic view illustrating the solid electrolyte membrane according to an embodiment of the present disclosure.

BEST MODE

Figure 3:
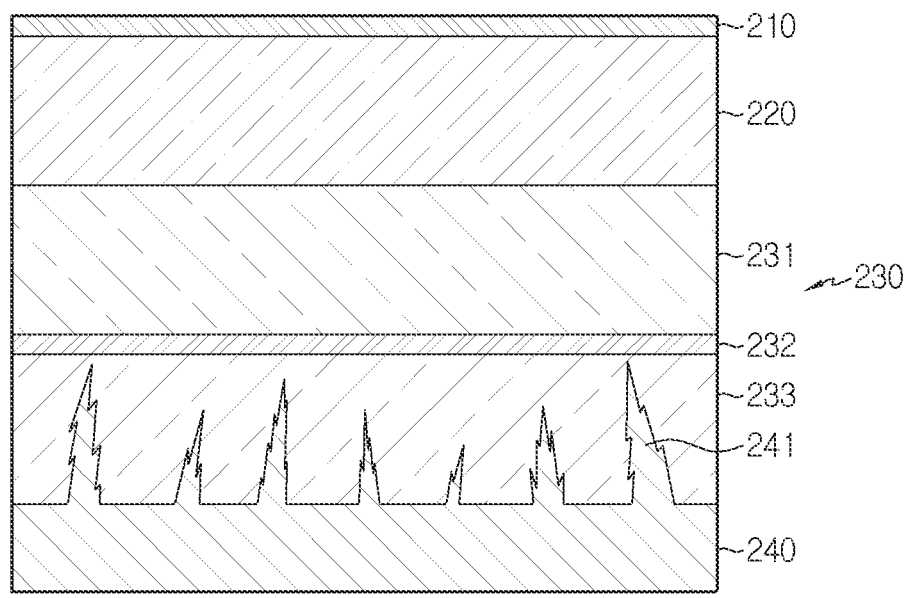
FIG. 3 is a schematic view illustrating the solid-state battery according to an embodiment of the present disclosure, wherein growth of lithium dendrite is inhibited by the growth-inhibiting material comprised in a solid electrolyte membrane.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [comprises] an element' does not preclude the presence of any additional elements but means that the part may further comprise the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure comprising an accurate or absolute numerical value provided to help understanding of the present disclosure.

As used herein, the expression 'A and/or B' means 'A, B or both of them'. Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms comprise the above-listed words, derivatives thereof and words having similar meanings.

The present disclosure relates to an electrolyte membrane for a secondary battery and a secondary battery comprising the same. According to the present disclosure, the secondary battery may be a lithium ion secondary battery. According to an embodiment of the present disclosure, the secondary battery may be a solid-state battery using a solid electrolyte and the battery may comprise lithium metal as a negative electrode active material.

FIG. 2 is a schematic view illustrating the solid electrolyte membrane according to an embodiment of the present disclosure, and the solid electrolyte membrane 130 comprises a second solid electrolyte layer 131, an inhibiting layer 132 and a first solid electrolyte layer 133, stacked successively. Hereinafter, the present disclosure will be explained in more detail with reference to FIG. 2.

(1) Solid Electrolyte Membrane

The solid electrolyte membrane according to the present disclosure comprises an inhibiting layer, and the solid electrolyte membrane may be applied as an ion conductive electrolyte for a solid-state battery using no liquid electrolyte. According to an embodiment of the present disclosure, the solid electrolyte membrane may comprise two or more solid electrolyte layers and an inhibiting layer may be interposed between the solid electrolyte layers. According to the present disclosure, each solid electrolyte layer comprises an ion conductive solid electrolyte material and the inhibiting layer comprises a dendrite growth-inhibiting material.

According to the present disclosure, the solid electrolyte membrane comprises an inhibiting layer, electrically insulates a positive electrode and a negative electrode from each other, and provides an ion channel between the positive electrode and the negative electrode. In addition, the solid electrolyte membrane may have an ion conductivity of $1 \times 10^{-7}$ S/cm or more, preferably $1 \times 10^{-5}$ S/cm or more under the temperature of 25° C.-150° C.

According to an embodiment of the present disclosure, the solid electrolyte membrane may have a thickness of 5-500 μm. The solid electrolyte membrane may have a thickness of 10 μm or more, 20 μm or more, 30 μm or more, 50 μm or more, 100 μm or more, 200 μm or more, or 300 μm or more in terms of physical strength and shape stability. Meanwhile, the solid electrolyte membrane may have a thickness of 400 μm or less, 300 μm or less, 200 μm or less, 100 μm or less, 70 μm or less, or 50 μm or less in terms of ion conductivity. For example, the solid electrolyte membrane may have a thickness of 30-100 μm, or 30-50 μm.

The ion conductive solid electrolyte material may comprise at least one of a polymeric solid electrolyte and an inorganic solid electrolyte.

According to an embodiment of the present disclosure, the polymeric solid electrolyte comprises a polymer resin and a lithium salt, and may be a solid polymer electrolyte present in the form of a mixture of a solvated lithium salt with a polymer resin, or a polymer gel electrolyte prepared by impregnating a polymer resin with an organic electrolyte comprising an organic solvent and a lithium salt.

According to an embodiment of the present disclosure, the solid polymer electrolyte may comprise, as a polymer resin, any one selected from the group consisting of a polyether polymer, polycarbonate polymer, acrylate polymer, polysiloxane polymer, phosphazene polymer, polyethylene derivatives, alkylene oxide derivatives, phosphate polymer, polyagitation lysine, polyester sulfide, polyvinyl alcohol, polyvinylidene fluoride and a polymer comprising an ionically dissociable group, or a mixture of two or more of them. However, the scope of the present disclosure is not limited thereto.

According to an embodiment of the present disclosure, the solid polymer electrolyte may comprise, as a polymer resin, any one selected from the group consisting of a branched copolymer comprising polyethylene oxide (PEO) backbone copolymerized with a comonomer comprising an amorphous polymer, such as polymethylmethacrylate (PMMA), polycarbonate, polydimethylsiloxane (PDMS) and/or phosphazene, comb-like polymer and a crosslinked polymer resin, or a mixture of two or more of them.

According to an embodiment of the present disclosure, the polymer gel electrolyte comprises a lithium salt-containing organic electrolyte and a polymer resin, wherein the organic electrolyte is used in an amount of 60-400 parts by weight based on the weight of the polymer resin. There is no particular limitation in the polymer used for the gel electrolyte, and particular examples of the polymer comprise any one selected from the group consisting of polyvinyl chloride (PVC) polymers, poly(methyl methacrylate) (PMMA) polymers, polyacrylonitrile (PAN), polyvinylidene fluoride (PVdF) and poly(vinylidene fluoride-co-hexafluoropropylene: PVdF-HFP), or a mixture of two or more of them. However, the scope of the present disclosure is not limited thereto.

In addition, as an electrolyte salt, the lithium salt is an ionizable lithium salt and may be represented by $Li^+X^-$. The anion (X) of lithium salt is not particularly limited and particular examples thereof comprise $F^-$, $Cl^-$, $Br^-$, $I^-$, $No_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

Meanwhile, according to an embodiment of the present disclosure, the polymer solid electrolyte may further comprise a polymer gel electrolyte. The polymer gel electrolyte has high ion conductivity ($10^{-4}$ S/cm or more) and has binding property so that it may provide not only a function as an electrolyte but also a function as an electrode binder resin imparting binding force in electrode active material particles and between an electrode layer and a current collector.

According to the present disclosure, when a polymer material is used as an electrolyte material for the solid electrolyte layer of the solid electrolyte membrane, the solid electrolyte layer may further comprise a crosslinking agent and/or initiator for the preparation thereof. The crosslinking agent and/or initiator is capable of initiating crosslinking or polymerization depending on heat, light and/or temperature conditions, and is not particularly limited as long as it can induce crosslinking and/or polymerization of a polymer material. According to an embodiment of the present disclosure, the crosslinking agent and/or initiator may comprise an organic peroxide, an organometallic reagent such as alkylated silver, azo-based compound, or the like, but is not limited thereto.

Meanwhile, according to the present disclosure, the inorganic solid electrolyte may comprise a sulfide-based solid electrolyte, an oxide-based solid electrolyte, or both.

According to an embodiment of the present disclosure, the sulfide-based solid electrolyte is one comprising a sulfur atom therein and is not particularly limited. The sulfide-based solid electrolyte may comprise at least one of a crystalline solid electrolyte, non-crystalline solid electrolyte (vitreous solid electrolyte) and a vitreous ceramic solid electrolyte. Particular examples of the sulfide-based solid electrolyte may comprise an LPS type compound comprising sulfur and phosphor, $Li_{4-x}Ge_{1-x}P_xS_4$ (x is 0.1-2, particularly x is ¾, ⅔), $Li_{10\pm1}MP_2X_{12}$ (M=Ge, Si, Sn, Al, X=S, Se), $Li_{3.833}Sn_{0.833}AS_{0.166}S_4$, $Li_4SnS_4$, $Li_{3.25}Ge_{0.25}P_{0.75}S_4$, $Li_2S$—$P_2S_5$, $B_2S_3$—$Li_2S$, $XLi_2S$-(100-X)$P_2S_5$ (x is 70-80), $Li_2S$—$SiS_2$—$Li_2S$—$P_2S_5$—LiI, $Li_2S$—$SiS_2$—LiI, $Li_2S$—$B_2S_3$—LiI, or the like, but is not limited thereto.

According to an embodiment of the present disclosure, the oxide-based solid electrolyte may be selected suitably from an LLT type electrolyte having a perovskite structure, such as $Li_{3x}La_{2/3-x}TiO_3$, LISCON such as $Li_{14}Zn(GeO_4)_4$, LATP type electrolyte such as $Li_{1.3}Al_{0.3}Ti_{1.7}(PO_4)_3$, LAGP type electrolyte such as $(Li_{1+x}Ge_{2-x}Al_x(PO_4)_3)$, phosphate electrolyte such as LiPON, or the like, but is not limited thereto.

(2) Inhibiting Layer

According to the present disclosure, the solid electrolyte membrane comprises an inhibiting layer comprising a lithium dendrite growth-inhibiting material (see, FIG. 2). The inhibiting material may be dispersed in the inhibiting layer with regular or random distribution. As used herein, 'dendrite growth-inhibiting material' may be referred to as 'inhibiting material' in brief.

Figure 4:
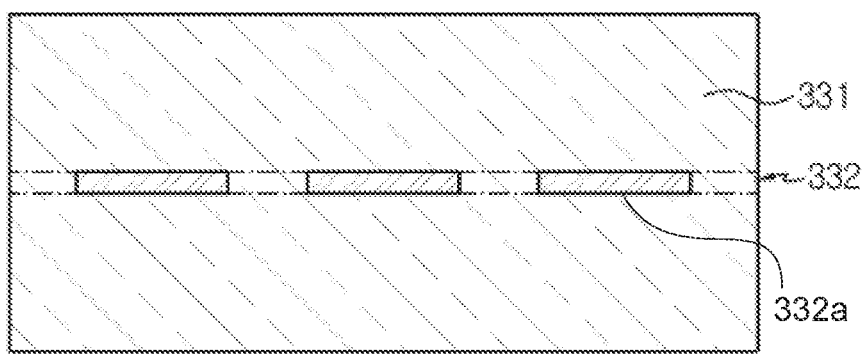
FIG. 4 is a schematic view illustrating a solid electrolyte membrane comprising a patterned inhibiting layer.

According to an embodiment of the present disclosure, the inhibiting layer may have a patterned shape comprising pattern units comprising the inhibiting material and arranged regularly or randomly in the inhibiting layer. The pattern unit is one comprising the inhibiting material at a high concentration in the inhibiting layer. For example, the pattern unit means a portion comprising the inhibiting material at a concentration of 50 wt % or more, 60 wt % or more, or 70 wt % or more based on 100 wt % of one pattern unit. The pattern unit may comprise the inhibiting material alone, or may comprise a mixture of the inhibiting material with a solid electrolyte material, if necessary. Meanwhile, the non-coated portion that may be present between the pattern units may be embedded by the solid electrolyte layers stacked on the upper or lower portion of the inhibiting layer (see, FIG. 6), or may be filled with a separate solid electrolyte material (see, FIG. 4). According to an embodiment of the present disclosure, the pattern units are not limited to a particular shape. The planar shape of the pattern units may be a closed curve shape such as a linear, circular or square shape. In the case of linear patterns, they may be formed in such a manner that they may be in parallel with one another or may be crossed. For example, the pattern units may have a stripe-like or dot-like planar shape. FIG. 4 is a schematic sectional view illustrating the solid electrolyte membrane 330 according to an embodiment of the present disclosure, wherein the solid electrolyte membrane comprises a plurality of pattern elements 332a in an inhibiting layer 332. According to an embodiment of the present disclosure, the solid electrolyte layer may be coated with the inhibiting layer at a ratio less than 80%, less than 70%, less than 60% or less than 50% based on 100 area % of the surface thereof, preferably. When the inhibiting layer is formed in such a manner that it may cover the surface of the solid electrolyte layer excessively, the ion conductivity of the solid electrolyte membrane may be degraded, since the ion channel is interrupted by the inhibiting layer. When the coating area of the inhibiting layer satisfies the above-defined range, it is possible to provide a high effect of inhibiting growth of lithium dendrite and to prevent degradation of lithium ion conductivity caused by formation of the inhibiting layer. However, the above-mentioned shapes of the inhibiting layer and solid electrolyte membrane are illustrative and any shapes may be applied with no particular limitation, as long as the structural characteristics of the present disclosure may be realized.

According to the present disclosure, the inhibiting layer may have a variable thickness depending on the preparation thereof. For example, the inhibiting layer may have a thickness larger than 0 and equal to or less than 100 μm. When the inhibiting layer is patterned by the mixture with a solid electrolyte material as described above, it may have a thickness of 1-100 μm. Within the above-defined range, the thickness may be 70 μm or less, 50 μm or less, or 30 μm or less.

Figure 6:
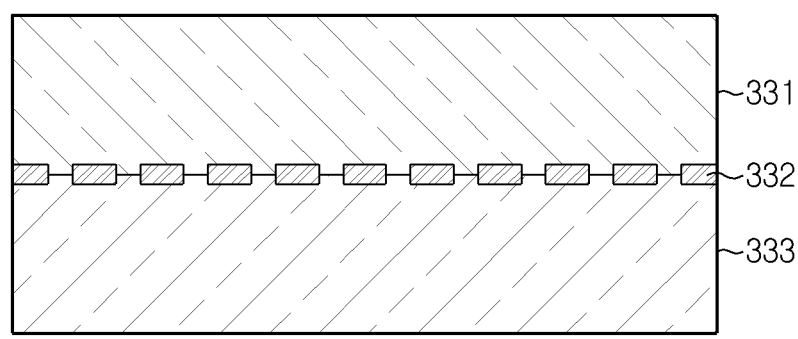
FIGS. 6 and 7 are schematic sectional views each illustrating the solid electrolyte membrane according to an embodiment of the present disclosure.

According to an embodiment of the present disclosure, the inhibiting layer may be formed by introducing an inhibiting material to a suitable solvent to provide an inhibiting material solution and coating the surface of the solid electrolyte layer with the inhibiting material solution. When the inhibiting layer is introduced in the above-mentioned manner, it is possible to provide the inhibiting layer with a very small thickness. For example, it is possible to provide the inhibiting layer in the form of a thin film with a nanometer scale. In addition, according to an embodiment of the present disclosure, the inhibiting layer may be formed by coating the solution in a stripe- or dot-like shape. In this case, the non-coated portion having no pattern unit has an excessively small thickness, and thus it is embedded by the solid electrolyte layers stacked on the upper or lower part thereof. Thus, it is possible to minimize interlayer spacing between the upper solid electrolyte layer and the lower solid electrolyte layer or to minimize an increase in interfacial resistance caused thereby. FIG. 6 is a schematic view illustrating an embodiment in which the non-coated portion of the inhibiting layer 332 is embedded and packed by the first solid electrolyte layer 333 and the second solid electrolyte layer 331. When forming the inhibiting layer by applying the inhibiting material solution as described above, the inhibiting layer may be formed to have a thickness of 700 nm or less, 500 nm or less, 300 nm or less, 100 nm or less, or 50 nm or less.

According to an embodiment of the present disclosure, besides the method for forming an inhibiting layer by applying an inhibiting material solution directly to the surface of a solid electrolyte layer, a method for forming an inhibiting layer by patterning it on a separate release sheet and transferring the patterned inhibiting layer to a solid electrolyte layer, a method for patterning a solid electrolyte layer by using lithography, or the like, may also be used. Meanwhile, when the inhibiting layer is patterned, the inhibiting material may be further exposed through $O_2$ plasma, UV-ozone or etching, after carrying out patterning.

According to an embodiment of the present disclosure, a method of self-assemblage of a copolymer may be applied and very fine pattern units (micelles, etc.) with a nanometer scale may be aligned on the inhibiting layer with uniform distribution through the method. The inhibiting layer formed by the self-assemblage of a copolymer comprises an inhibiting material and a copolymer, wherein the inhibiting material is chemically bound to the copolymer. As used herein, 'chemically bound' means that the inhibiting material is bound with the copolymer through a chemical means, such as ionic bonding, covalent bonding or coordinate bonding. Meanwhile, as used herein, the dendrite growth-inhibiting material may be referred to as inhibiting material in brief. When the inhibiting layer is formed by the self-assemblage of a copolymer as described above, the inhibiting layer may be formed to have a thickness of 1 µm or less, 700 nm or less, 500 nm or less, 300 nm or less, 100 nm or less, or 50 nm or less.

According to the present disclosure, the inhibiting material has lower ionization tendency as compared to lithium. Since the inhibiting material has lower reactivity as compared to lithium, it has lower ionization tendency. For this reason, the inhibiting material prevents the lithium ions from reduction and deposition of lithium metal. In addition, deposited lithium is oxidized back to lithium ions to provide an effect of reducing dendrite.

According to the present disclosure, the inhibiting material (a) is derived from at least one of a1) metal(s) having lower ionization tendency lower as compared to lithium, and a2) alloy(s) of two or more of the above-mentioned metals, and is a mixture comprising at least one of a salt thereof and ion thereof, wherein the mixture is distributed in the inhibiting layer. In other words, the inhibiting layer comprises at least one of salts of the metals, salts of the alloys, ions of the metals and ions of the alloys.

According to an embodiment of the present disclosure, the metal a1) may be at least one selected from the group consisting of K, Sr, Ca, Na, Mg, Be, Al, Mn, Zn, Cr(+3), Fe, Cd, Co, Ni, Sn, Pb, Cu, Hg, Ag, Pd, Ir, Pt(+2), Au and Pt(+4). In addition, the alloy a2) is formed by alloying of two or more metals selected from the metal ingredients. According to an embodiment of the present disclosure, the metal salt may be at least one of chloride, iodide, cyanide, bromide, sulfide, hydroxide, phosphite and chloride hydrate. However, the scope of the present disclosure is not limited thereto, as long as the metal or alloy can react with lithium metal to oxidize lithium metal into ionic forms. Meanwhile, according to an embodiment of the present disclosure, an inhibiting material having lower ionization tendency provides a higher effect of inhibiting growth of lithium dendrite. Thus, the inhibiting material may comprise at least one of Au and Pt. According to an embodiment of the present disclosure, when Au is used as an inhibiting material, a salt thereof, $HAuCl_4 \cdot H_2O$, may be introduced when forming the inhibiting layer. When Pt is used as an inhibiting material, a salt thereof, $H_2PtCl_6 \cdot H_2O$, may be introduced when forming the inhibiting layer.

Meanwhile, when patterning the inhibiting material through the self-assemblage of a copolymer according to an embodiment of the present disclosure, the copolymer comprises a functional group capable of being bound chemically with the inhibiting material. In other words, the inhibiting material is bound with the copolymer by means of the functional group. According to an embodiment of the present disclosure, the functional group comprises oxygen or nitrogen. For example, the functional group may comprise at least one selected from functional groups, such as ether and amine, capable of being bound with a metal salt. Attraction force works between the negative (−) charge of oxygen or nitrogen in the functional group and the positive (+) charge of metal ion in the metal salt to form such binding.

Particular examples of the copolymer may comprise polystyrene-block-poly (2-vinylpyridine) copolymer, polystyrene-block-poly(4-vinylpyridine) copolymer, poly(1,4-isoprene)-block-polystyrene-block-poly(2-vinylpyridine) copolymer and polystyrene-block-poly(ethylene oxide) copolymer. However, the copolymer is not limited thereto, as long as it comprises the above-mentioned functional group and can form a nano-scaled micropattern through self-assemblage.

Figure 5:
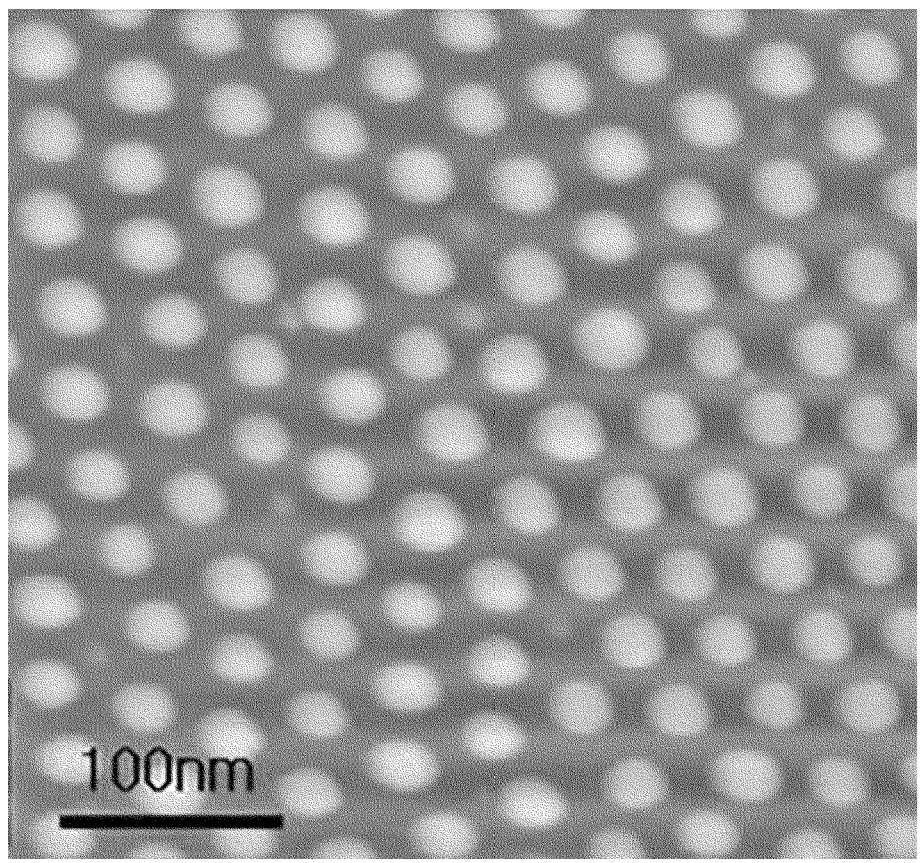
FIG. 5 shows an atomic force microscopic (AFM) image of the inhibiting layer prepared according to Example 5.

According to an embodiment of the present disclosure, the inhibiting layer may comprise micelles formed by the self-assembled block copolymer and aligned in a hexagonal close packed structure. For example, when using polystyrene-block-poly(4-vinylpyridine) as a block copolymer, micelles essentially comprising polyvinylpyridine blocks (PVP) are arranged in a matrix essentially comprising polystyrene blocks (PS) according to a specific regulation, and the inhibiting material bound to the PVP blocks can ensure a highly uniformly dispersed state over the whole surface of the inhibiting layer through such arranged micelles. The micelles may comprise core portions and shell portions surrounding the core surfaces, and the inhibiting material is bound to the core portions and/or shell portions. FIG. 5 shows an atomic force microscopic (AFM) image of the inhibiting layer prepared according to Example 5, wherein micelles are aligned on the surface of a solid electrolyte layer in a hexagonal close packed structure.

Figure 7:
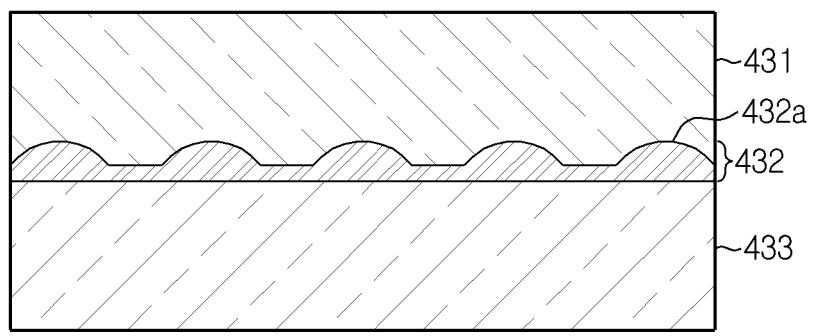

FIG. 7 is a schematic sectional view illustrating an inhibiting layer formed by a self-assembled block copolymer and a solid electrolyte membrane comprising the same. Referring to FIG. 7, the solid electrolyte membrane 430 comprises an inhibiting layer 432 interposed between a first solid electrolyte layer 433 and a second solid electrolyte layer 431. The micelles 432a, particularly the core portions thereof, have a relatively larger thickness, while the gap between micelles has a relatively smaller thickness. In a variant, the gap between micelles may have no matrix depending on processing conditions, such as a spin coating rate, micelle solution concentration, or the like. Therefore, even when the inhibiting layer is disposed in such a form that it may cover most of the solid electrolyte layer surface, lithium ions may be penetrated through the matrix, and thus the ion conductivity of the solid electrolyte layer may be retained adequately. Even when the ion conductivity is reduced slightly, there is no problem in use as a solid electrolyte membrane. According to an embodiment of the present disclosure, it is possible to control the thickness of the inhibiting layer through $O_2$ plasma or UV-ozone treatment. In this manner, it is possible to conduct ions while inhibiting growth of lithium dendrite by the inhibiting material bound to the cores of the micelles.

According to an embodiment of the present disclosure, the micelles may have a size of 20-300 nm, and the gap between micelles may be 10-500 nm.

As described above, the electrolyte membrane according to the present disclosure comprises an inhibiting material, and thus it can effectively inhibit a short-circuit caused by growth of lithium dendrite when it is applied to a solid-state battery comprising lithium metal.

(3) Structure of Solid Electrolyte Membrane

According to an embodiment of the present disclosure, the solid electrolyte membrane comprises an inhibiting layer comprising an inhibiting material. According to an embodiment, the solid electrolyte membrane may comprise two or more solid electrolyte layers and one or more inhibiting layer, wherein the inhibiting layer may be disposed between the solid electrolyte layers. For example, the solid electrolyte membrane may have a layered structure comprising a first solid electrolyte layer, an inhibiting layer and a second solid electrolyte layer, stacked successively (see, FIG. 2). In a variant, the solid electrolyte membrane may be provided with a first solid electrolyte layer, a second solid electrolyte layer and a third solid electrolyte layer, wherein a first inhibiting layer may be disposed between the first and the second solid electrolyte layers and a second inhibiting layer may be disposed between the second and the third solid electrolyte layers. The inhibiting layers are independent from each other in terms of shapes and materials, and one inhibiting layer may be the same as or different from the other inhibiting layer. In addition, the solid electrolyte layers are independent from one another in terms of shapes and materials, and one solid electrolyte may be the same as or different from another solid electrolyte layer.

According to the present disclosure, the solid electrolyte membrane with the inhibiting layer provided therein may show an ion conductivity of $1\times10^{-7}$ S/cm or more, preferably $1\times10^{-5}$ S/cm or more.

The inhibiting layer comprises the inhibiting material at a higher concentration as compared to the other layers (such as the solid electrolyte layer). For example, the inhibiting layer may comprise the inhibiting material in an amount of 10-90 wt % based on 100 wt % of the inhibiting layer. Within the above-defined range, the content of the inhibiting material may be 30 wt % or more, 50 wt % or more, 70 wt % or more, or 80 wt % or more. In addition to this or independently from this, the content of the inhibiting material may be 80 wt % or less, 70 wt % or less, or 60 wt % or less. The concentration of the inhibiting material in the inhibiting layer may be controlled to an adequate range, considering the effect of inhibiting dendrite, ion conductivity of the solid electrolyte membrane and manufacturing cost of the battery resulting from the use of a noble metal as an inhibiting material. Meanwhile, according to an embodiment of the present disclosure, 50 wt % or more of the inhibiting material may be present in the inhibiting layer based on 100 wt % of the total amount of inhibiting materials comprised in the solid electrolyte membrane.

According to an embodiment of the present disclosure, the inhibiting layer may further comprise at least one of a binder resin and an ion conductive solid electrolyte material, in addition to the inhibiting material. The binder resin is not particularly limited, as long as it assists the binding of inhibiting materials and the binding between the inhibiting layer and the solid electrolyte layer and is an electrochemically stable ingredient. Non-limiting examples of the binder resin comprise acrylic polymers, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, ethylene-propylene-diene monomer (EPDM), sulfonated EPDM, styrene butadiene rubber, fluororubber, various copolymers, or the like.

According to the present disclosure, the thickness of the inhibiting layer, concentration of the inhibiting material in the inhibiting layer, area of the solid electrolyte layer covered with the inhibiting layer, or the like, may be controlled adequately, considering the ion conductivity of the solid electrolyte membrane. In addition, the thickness of the inhibiting layer, concentration of the inhibiting material, area of the solid electrolyte layer covered with the inhibiting layer, or the like, may be controlled to an adequate range in such a manner that the solid electrolyte membrane may show an ion conductivity of $1\times10^{-7}$ S/cm or more, preferably $1\times10^{-5}$ S/cm or more.

According to an embodiment of the present disclosure, the inhibiting layer may be formed as follows. According to an embodiment of the present disclosure, the inhibiting layer may be formed by applying an inhibiting material solution comprising an inhibiting material mixed with a solvent to the surface of the first solid electrolyte layer, followed by drying. In this case, the inhibiting layer may be coated on one surface of the first solid electrolyte layer to a very small thickness. In this case, the coated inhibiting layer comprises the inhibiting material alone, and thus the inhibiting layer may be formed to have a very small nanometer-scale thickness less than 1 μm. According to another embodiment of the present disclosure, when the inhibiting layer comprises a composite of the inhibiting material with a solid electrolyte material and/or binder resin, it may be formed to have a larger thickness as compared to the inhibiting layer comprising the inhibiting material alone.

In addition, the first and the second solid electrolyte layers comprise an ion conductive solid electrolyte material and may further comprise an inhibiting material, a binder resin or both, if necessary. The inhibiting material in the first and the second solid electrolyte layers may be dispersed with uniform distribution. In addition, the inhibiting material may be used in an amount of 0-50 wt % based on 100 wt % of the solid electrolyte layer. Within the above-defined range, the content of the inhibiting material in the solid electrolyte layer may be 40 wt % or less, 30 wt % or less, 20 wt % or less, or 10 wt % or less.

The inhibiting material and ion conductive solid electrolyte material comprised in the inhibiting layer and the first and the second solid electrolyte layers are the same as described above.

Meanwhile, according to an embodiment of the present disclosure, the compositions of the ion conductive solid electrolytes comprised in the first and the second solid electrolyte layers may be the same or different. For example, the first solid electrolyte layer may comprise an oxide-based solid electrolyte material and the second solid electrolyte layer may comprise a sulfide-based solid electrolyte material.

According to an embodiment of the present disclosure, the solid electrolyte membrane may be obtained by forming the first solid electrolyte layer, forming the inhibiting layer on the surface thereof, and forming the second solid electrolyte layer on the surface of the inhibiting layer. If two or more inhibiting layers are used, the solid electrolyte membrane may be obtained by forming the third solid electrolyte layer, after forming the inhibiting layer on the surface of the second solid electrolyte layer. According to an embodiment of the present disclosure, when manufacturing a solid electrolyte membrane comprising a larger number of inhibiting layers or solid electrolyte layers, formation of the inhibiting layer and the solid electrolyte layer may be carried out repeatedly.

According to an embodiment of the present disclosure, when patterning the inhibiting layer, the inhibiting layer may be formed as a patterned layer with a convex pattern on the surface of the first solid electrolyte layer. Then, slurry for the second solid electrolyte layer may be applied to the surface of the inhibiting layer so that the non-coated portion (portion having no inhibiting layer) may be embedded by the second solid electrolyte. For example, inhibiting layer pattern elements comprising the inhibiting material are formed on the surface of the first solid electrolyte layer. Then, the surface is covered with the second solid electrolyte layer to form the solid electrolyte membrane. According to an embodiment of the present disclosure, the second solid electrolyte layer may be formed from slurry having fluidity. Then, the slurry is applied to the surface of the first solid electrolyte layer comprising the inhibiting layer pattern elements so that the non-coated portion between the pattern elements may be embedded, thereby preventing formation of a vacant space at the interface in the inhibiting layer/first solid electrolyte layer/second solid electrolyte layer.

In a variant, the inhibiting layer may be formed by forming a concave pattern with a predetermined thickness from the surface of the first solid electrolyte layer, and inlaying the inhibiting material in the concave pattern (inlay method). Then, the surface of the inhibiting layer is covered with the second solid electrolyte layer to obtain the solid electrolyte membrane.

According to an embodiment of the present disclosure, the inhibiting layer may be patterned through the self-assemblage of a copolymer. Any method for forming the inhibiting layer by using self-assemblage may be applied, as long as it allows formation of micelles and regular or random alignment thereof in the inhibiting layer. For example, a suitable copolymer capable of self-assemblage is introduced to a solvent to prepare a polymer solution and an inhibiting material is introduced to the polymer solution, thereby providing a mixture for forming an inhibiting material. The polymer solution and the mixture may be subjected to an agitation process for the purpose of homogeneous dispersion of the ingredients introduced to the solvent. Particularly, it is possible to accelerate the chemical binding of the inhibiting material with the copolymer by agitating the mixture. Then, the prepared mixture is applied to the surface of a solid electrolyte layer and then dried to induce self-assemblage. For example, the mixture may be applied by using a spin coating process. Herein, the coating rate may be controlled to a range of about 1,000-5,000 rpm. Meanwhile, according to an embodiment of the present disclosure, the solvent may comprise at least one selected from toluene, tetrahydrofuran, ethylene, acetone, chloroform and dimethyl formamide. For example, the solvent may comprise toluene with a view to alignment of micelles with a hexagonal close packed structure.

(4) Solid-State Battery

In another aspect, there is provided a solid-state battery comprising the solid electrolyte membrane. According to an embodiment of the present disclosure, the solid-state battery comprises a negative electrode, a positive electrode and a solid electrolyte membrane interposed between the negative electrode and the positive electrode, wherein the solid electrolyte membrane have the above-mentioned characteristics.

FIG. 3 is a schematic view illustrating the solid-state battery 200 according to an embodiment of the present disclosure. The solid-state battery comprises a positive electrode active material layer 220 formed on the surface of a positive electrode current collector 210, and a negative electrode 240 is stacked on the positive electrode with a solid electrolyte membrane 230 interposed therebetween. The solid electrolyte membrane 230 comprises the first solid electrolyte layer 233, inhibiting layer 232 and the second solid electrolyte layer 231, stacked successively. Lithium dendrite 241 may be grown at the negative electrode in the vertical direction and growth of lithium dendrite may be inhibited by the inhibiting layer 232.

Meanwhile, according to an embodiment of the present disclosure, in the electrolyte membrane of the solid-state battery, the first solid electrolyte layer comprises the inhibiting material at a lower concentration as compared to the inhibiting layer, and the first solid electrolyte layer may be disposed in such a manner that it may face the negative electrode. In the solid-state battery having such a structure, the first solid electrolyte layer may comprise a higher concentration of inhibiting material as compared to the second solid electrolyte layer, may have a larger thickness as compared to the second solid electrolyte layer, or may satisfy both.

In addition, according to an embodiment of the present disclosure, the surface of the solid electrolyte membrane facing the negative electrode may further provided with an additional element, such as a protective layer. Particularly, in order to inhibit reaction caused by direct contact with Li metal, a passivation layer using an inorganic material, such as an inorganic solid electrolyte, LiF or $Li_2O$, or an organic material, such as PEO, may be disposed.

According to the present disclosure, the negative electrode may comprise a current collector and a negative electrode active material layer formed on the surface of the current collector, wherein the negative electrode active material layer may comprise at least one element that belongs to alkali metals, alkaline earth metals, Group 3B metals and transition metals. According to an embodiment of the present disclosure, non-limiting examples of alkali metals comprise at least one metal selected from the group consisting of lithium (Li), sodium (Na), potassium (K), rubidium (Rb), cesium (Cs) and francium (Fr), preferably lithium. According to an embodiment of the present disclosure, the negative electrode may be formed by binding and stacking the negative electrode current collector with lithium metal foil having a predetermined thickness through compression.

According to the present disclosure, the positive electrode comprises a current collector and a positive electrode active material layer formed on at least one surface of the current collector. The positive electrode active material layer comprises a positive electrode active material, a solid electrolyte and a conductive material. According to an embodiment of the present disclosure, the positive electrode active material layer may further comprise a binder material. It is possible to increase the binding force of the positive electrode active material layer with the current collector and/or the solid electrolyte membrane by introducing the binder material. Independently from this or in addition to this, introduction of the binder material assists improvement of the binding force of the ingredients comprised in the positive electrode active material.

The positive electrode active material may be any material used conventionally as a positive electrode active material for a lithium secondary battery. Non-limiting examples of the positive electrode active material may comprise, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; lithium nickel oxides represented by the chemical formula of $LiNi_{1-x}MxO_2$ (wherein M is Co, Mn, Al, Cu, Fe, Mg, B or Ga, and x is 0.01-0.3), such as $LiNi_{0.8}Co_{0.1}M_{0.1}O_2$; lithium manganese composite oxides represented by the chemical formula of $LiMn_{2-x}MxO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

The conductive material is not particularly limited, as long as it causes no chemical change in the corresponding battery and has conductivity. For example, the conductive material comprise any one selected from: graphite, such as natural graphite or artificial graphite; carbon black, such as acetylene black, Ketjen black, channel black, furnace black, lamp black or thermal black; conductive fibers, such as carbon fibers (e.g. vapor grown carbon fibers (VGCF)) or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

The binder material is not particularly limited, as long as it is an ingredient which assists binding between the active material and the conductive material and binding to the current collector. Particular examples of the binder material comprise polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. In general, the binder material is added in an amount of 1-30 wt %, or 1-10 wt %, based on 100 wt % of the electrode layer.

According to an embodiment of the present disclosure, the negative electrode and/or the positive electrode may further comprise various additives in order to supplement or improve the physicochemical properties thereof. Although there is no particular limitation, the additives may comprise at least one of an oxidation-stabilizing agent, reduction-stabilizing agent, flame retardant, heat stabilizer, anti-fogging agent, or the like.

In addition, the current collector is generally formed to have a thickness of 3-500 μm. The current collector is not particularly limited, as long as it causes no chemical change in the corresponding battery and has high conductivity. For example, the current collector may comprise copper, stainless steel, aluminum, nickel, titanium, baked carbon, or aluminum or stainless steel surface-treated with carbon, nickel, titanium, silver, or the like. Any suitable current collector may be used depending on polarity of the electrode (positive or negative electrode).

In still another aspect, there are provided a battery module comprising the secondary battery as a unit cell, a battery pack comprising the battery module, and a device comprising the battery pack as a power source.

Herein, particular examples of the device may comprise, but are not limited to: power tools driven by an electric motor; electric cars, comprising electric vehicles (EV), hybrid electric vehicles (HEV), plug-in hybrid electric vehicles (PHEV), or the like; electric carts, comprising electric bikes (E-bikes) and electric scooters (E-scooters); electric golf carts; electric power storage systems; or the like.

(5) Method for Manufacturing Solid Electrolyte Membrane

Hereinafter, a method for manufacturing the above-described solid electrolyte membrane will be explained. The following method is one of the embodiments that may be applied to manufacture the solid electrolyte membrane according to the present disclosure and the scope of the present disclosure is not limited thereto. First, the first solid electrolyte layer is prepared. The electrolyte layer may be obtained by the method for preparing a solid electrolyte layer according to an embodiment of the present disclosure and is not limited to a specific method. For example, when the electrolyte layer comprises a polymer electrolyte, the solid electrolyte layer may be prepared as follows. A polymer resin is dissolved in an adequate solvent, such as acetonitrile, to prepare a polymer solution, and a lithium salt is introduced thereto to prepare slurry for forming an electrolyte layer. The slurry may be warmed to an adequate temperature in order to dissolve the polymer resin and the lithium salt, and may be agitated for several hours to several tens of hours. In addition, the polymer solution may further comprise an initiator and a curing agent. The initiator and the curing agent may be introduced together into the polymer solution, or an additive solution comprising the initiator and the curing agent may be prepared separately and added to the slurry. According to an embodiment of the present disclosure, the initiator may be used in an amount of about 10-20 parts by weight and the curing agent may be used in an amount of about 0.2-3 parts by weight, based on the weight of the polymer resin. Then, the prepared slurry is applied to a release film, followed by drying. In this manner, it is possible to obtain the first solid electrolyte layer. The release film is removed and the first solid electrolyte layer is used, or a solid electrolyte membrane provided with all elements is formed and then the release film may be removed at the final step.

Then, the inhibiting layer is formed on the surface of the first solid electrolyte layer. The inhibiting layer may be prepared in the form of a metal salt solution. For example, a hydrated metal salt is dissolved in ethanol and the solution is applied to the surface of the solid electrolyte layer, followed by drying, to prepare the inhibiting layer coated on and integrated with the surface of the solid electrolyte layer. The solution may be applied by a conventional coating process, such as spin coating or dip coating, but is not limited thereto.

After that, the second solid electrolyte layer is formed on the surface of the inhibiting layer. Similarly to the first solid electrolyte layer, slurry for forming the second solid electrolyte layer is prepared and the slurry is applied to the surface of the inhibiting layer, followed by drying, to prepare the second solid electrolyte layer integrated with the inhibiting layer. In a variant, similarly to the first solid electrolyte layer, the slurry is coated on the surface of a separate release film, the release film is removed and the second solid electrolyte layer may be bound to the surface of the inhibiting layer through a calendering or lamination process.

According to the present disclosure, the solvent used for each step is not particularly limited and any suitable solvent may be selected, considering the ingredients. For example, the solvent may comprise an organic solvent such as N-methyl pyrrolidone (NMP), dimethyl formamide (DMF), tetrahydrofuran, dimethoxyethane, nitromethane, acetone, pyridine, ethanol, acetonitrile or dimethyl acetamide, or water. Such solvents may be used alone or in combination.

Meanwhile, according to an embodiment of the present disclosure, an additional inhibiting layer may be further formed on the surface of the second solid electrolyte layer and the third solid electrolyte layer may be disposed on the surface of the inhibiting layer to provide a solid electrolyte membrane comprising two or more inhibiting layers.

In the above-described method, each solid electrolyte layer comprises a polymer solid electrolyte but the scope of the present disclosure is not limited thereto. Each solid electrolyte layer may comprise an inorganic solid electrolyte as an electrolyte material, instead of or in addition to the polymer solid electrolyte.

Examples will be described more fully hereinafter so that the present disclosure can be understood with ease. However, the following examples are for illustrative purposes only and the scope of the present disclosure is not limited thereto.

EXAMPLES

1. Manufacture of Solid Electrolyte Membrane

Example 1

(1) Preparation of First Solid Electrolyte Layer

Polyethylene oxide (PEO, Mw=4,000,000 g/mol) was dissolved in acetonitrile (AN) as a solvent to prepare a 4 wt % polymer solution. Herein, LiTFSI as a lithium salt was introduced together so that the mole ratio of $[EO]/[Li^+]=18/1$. The polymer solution was agitated overnight at 70° C. to dissolve PEO and the lithium salt sufficiently therein. Next, an additive solution comprising an initiator and a curing agent was prepared. The curing agent was PEGDA (Mw=575) and the initiator was benzoyl peroxide (BPO), wherein polyethylene glycol diacrylate (PEGDA) was used in an amount of 20 wt % based on PEO and BPO was used in an amount of 1% based on PEGDA. Acetonitrile was used as a solvent. The additive solution was agitated for about 1 hour so that the introduced ingredients might be mixed thoroughly. Then, the additive solution was added to the polymer solution and the two solutions were mixed sufficiently with each other. The resultant mixed solution was applied to and coated on a release film by using a doctor blade. The coating gap was set to 800 μm and the coating rate was set to 20 mm/min. The release film coated with the solution was transferred to a glass plate and the glass plate was balanced and dried at room temperature overnight, followed by vacuum drying at 100° C. for 12 hours. In this manner, the first solid electrolyte layer was obtained. The first solid electrolyte layer had a thickness of about 50 μm.

(2) Preparation of Inhibiting Layer $HAuCl_4·3H_2O$ was dissolved in ethanol to a concentration of 2 wt % to prepare a metal salt solution. Next, 20 μL of the metal salt solution was coated on the first solid electrolyte layer obtained from the preceding step through spin coating at a rate of 2,000 rpm.

(3) Preparation of Second Solid Electrolyte Layer

The second solid electrolyte layer was prepared in the same manner as the preparation of the first solid electrolyte layer.

(4) Manufacture of a Multi-Layered Solid Electrolyte Membrane

The first solid electrolyte layer coated with the inhibiting layer and the second solid electrolyte layer were stacked, and the gap between the two layers was controlled to 100 μm, followed by calendering at 60° C. Herein, the inhibiting layer was interposed between the first solid electrolyte layer and the second solid electrolyte layer. In this manner, a solid electrolyte membrane comprising the first solid electrolyte layer, inhibiting layer and the second solid electrolyte layer, stacked successively, was obtained. The resultant solid electrolyte membrane had a thickness of about 100 μm. It could be seen that the inhibiting layer was formed to such a very small thickness that it had no effect upon the total thickness of the solid electrolyte membrane.

Example 2

A solid electrolyte membrane was obtained in the same manner as Example 1, except that $HAuCl_4·3H_2O$ was used at a concentration of 5 wt % when preparing the solid electrolyte layer.

Example 3

A solid electrolyte membrane comprising the first solid electrolyte layer, inhibiting layer, the second solid electrolyte layer, inhibiting layer and the third solid electrolyte, stacked successively, was obtained. The solid electrolyte membrane according to Example 3 had a structure different from the structure of the solid electrolyte membrane according to Example 1, wherein an additional inhibiting layer and the third solid electrolyte layer were added to the solid electrolyte membrane according to Example 1. Each of the layers was prepared in the same manner as Example 1.

Example 4

A solid electrolyte membrane was obtained in the same manner as Example 1, except that $H_2PtCl_6·H_2O$ was used as a material for preparing the inhibiting layer of the solid electrolyte membrane.

Example 5

(1) Preparation of First Solid Electrolyte Layer

Polyethylene oxide (PEO, Mw=4,000,000 g/mol) was dissolved in acetonitrile (AN) as a solvent to prepare a 4 wt % polymer solution. Herein, LiTFSI as a lithium salt was introduced together so that the mole ratio of $[EO]/[Li^+]=18/1$. The polymer solution was agitated overnight at 70° C. to dissolve PEO and the lithium salt sufficiently therein. Next, an additive solution comprising an initiator and a curing agent was prepared. The curing agent was PEGDA (Mw=575) and the initiator was benzoyl peroxide (BPO), wherein polyethylene glycol diacrylate (PEGDA) was used in an amount of 20 wt % based on PEO and BPO was used in an amount of 1% based on PEGDA. Acetonitrile was used as a solvent. The additive solution was agitated for about 1 hour so that the introduced ingredients might be mixed thoroughly. Then, the additive solution was added to the polymer solution and the two solutions were mixed sufficiently with each other. The resultant mixed solution was applied to and coated on a release film by using a doctor blade. The coating gap was set to 800 μm and the coating rate was set to 20 mm/min. The release film coated with the solution was transferred to a glass plate and the glass plate was balanced and dried at room temperature overnight, followed by vacuum drying at 100° C. for 12 hours. In this manner, the first solid electrolyte layer was obtained. The first solid electrolyte layer had a thickness of about 50 μm.

(2) Preparation of Inhibiting Layer

Polystyrene-block-poly(4-vinyl pyridine) (S4VP, PS Mn 41.5 kg/mol, P4VP Mn 17.5 kg/mol) was agitated in toluene at a concentration of 0.5 wt % at room temperature overnight. Next, $HAuCl_4 \cdot 3H_2O$ was added to the resultant solution to a concentration of 2 wt % based on P4VP and the resultant solution was agitated for 6 hours so that Au ions might be bound to S4VP micelles. The solution was spin-coated on the first solid electrolyte layer obtained as described above at a rate of 3,000 rpm to carry out patterning of a single layer of S4VP micelles through self-assemblage. FIG. 5 shows an atomic force microscopic (AFM) image of the resultant inhibiting layer. The light portion represents a micelle portion and the dark portion represents the first solid electrolyte layer portion. Herein, the micelles have a size of 40 nm and the gap between micelles is about 70 nm.

(3) Preparation of Second Solid Electrolyte Layer

The second solid electrolyte layer was prepared in the same manner as the preparation of the first solid electrolyte layer.

(4) Manufacture of a Multi-Layered Solid Electrolyte Membrane

The first solid electrolyte layer coated with the inhibiting layer and the second solid electrolyte layer were stacked, and the gap between the two layers was controlled to 100 μm, followed by calendering at 60° C. Herein, the inhibiting layer was interposed between the first solid electrolyte layer and the second solid electrolyte layer. In this manner, a solid electrolyte membrane comprising the first solid electrolyte layer, inhibiting layer and the second solid electrolyte layer, stacked successively, was obtained. The resultant solid electrolyte membrane had a thickness of about 100 μm. It could be seen that the inhibiting layer was formed to such a very small thickness that it had no effect upon the total thickness of the solid electrolyte membrane.

Example 6

A solid electrolyte membrane was obtained in the same manner as Example 5, except that $HAuCl_4 \cdot 3H_2O$ was used at a concentration of 5 wt % based on S4VP when preparing the solid electrolyte membrane.

Example 7

A solid electrolyte membrane was obtained in the same manner as Example 5, except that polystyrene-block-poly (2-vinyl pyridine)(S2VP, PS Mn 133 kg/mol, P2VP Mn 132 kg/mol) was used as a block copolymer of the inhibiting layer when preparing the solid electrolyte membrane.

Comparative Example 1

A solid electrolyte membrane was obtained in the same manner as Example 1, except that no inhibiting layer was inserted when preparing the solid electrolyte membrane.

Comparative Example 2

A solid electrolyte membrane was obtained in the same manner as comparative Example 1, except that merely three solid electrolyte layers were stacked without any inhibiting layer when preparing the solid electrolyte membrane.

2. Manufacture of Battery

NCM811 ($LiNi_{0.8}Co_{0.1}Mn_{0.1}O_2$) as a positive electrode active material, VGCF (vapor grown carbon fiber) as a conductive material and a polymeric solid electrolyte (PEO+ LiTFSI, 18:1 mole ratio) were mixed at a weight ratio of 80:3:17 and introduced to acetonitrile, followed by agitation, to obtain electrode slurry. An aluminum current collector having a thickness of 20 μm was prepared. The slurry was applied to the current collector by using a doctor blade and the resultant structure was vacuum dried at 120° C. for 4 hours. Next, pressing was carried out by using a roll press to obtain an electrode having an electrode loading of 2 mAh/$cm^2$, an electrode layer thickness of 48 μm and a porosity of 22%. Then, the electrode was cut into a circular shape having an area of 1.4875 $cm^2$. Lithium metal foil cut into a circular shape having an area of 1.7671 $cm^2$ was prepared as a counter electrode. Each of the solid electrolyte membranes obtained from Examples 1-7 and Comparative Examples 1 and 2 was interposed between the two electrodes to obtain a coin type half-cell.

3. Evaluation Tests (1) Evaluation of Ion Conductivity of Solid Electrolyte Layer Each of the solid electrolyte membranes obtained from Examples 1-7 and Comparative Examples 1 and 2 was cut into a circular shape having an area of 1.7671 $cm^2$. The solid electrolyte membrane was interposed between two sheets of stainless steel (SUS) to obtain a coin cell. An analyzer (VMP3, Biologic science instrument) was used to measure electrochemical impedance at 60° C. under the conditions of an amplitude of 10 mV and a scan range of 500 kHz to 200 MHz. Based on this, ion conductivity was calculated.

(2) Evaluation of Initial Discharge Capacity and Life Characteristics

Each of the batteries according to Examples 1-7 and Comparative Examples 1 and 2 was charged/discharged at 60° C. and 0.05 C to evaluate initial discharge capacity.

Charge condition: constant current (CC)/constant voltage (CV) (4.15V, 0.005 C current cut-off)

Discharge condition: CC condition, 3V (0.05 C)

Meanwhile, a point where a short-circuit occurs was judged as an abnormal behavior (unstable change in voltage) point of voltage during charge, when evaluating life characteristics by carrying out charge/discharge at 0.1 C.

TABLE 1

| | Ion conductivity (S/cm, 60° C.) | Discharge capacity (mAh/g, 4.15 V) | Short-circuit point (cycle) |
|---|---|---|---|
| Example 1 | $1 \times 10^{-4}$ | 159 | 18 |
| Example 2 | $9 \times 10^{-5}$ | 155 | 20 |
| Example 3 | $9 \times 10^{-5}$ | 142 | 23 |
| Example 4 | $1 \times 10^{-4}$ | 156 | 16 |
| Example 5 | $8 \times 10^{-5}$ | 151 | 17 |
| Example 6 | $8 \times 10^{-5}$ | 150 | 20 |
| Example 7 | $8 \times 10^{-5}$ | 142 | 14 |
| Comp. Ex. 1 | $1 \times 10^{-4}$ | 156 | 5 |
| Comp. Ex. 2 | $9 \times 10^{-5}$ | 145 | 8 |

As can be seen from Table 1, the batteries comprising the solid electrolyte membranes according to Examples 1-7 show higher ion conductivity and discharge capacity and a delayed short-circuit point, as compared to the batteries according to Comparative Examples. In other words, lithium dendrite is converted into lithium ions through chemical reaction with metal ions as an inhibiting material, thereby providing improved life characteristics. Herein, metal ion content and coating layer uniformity are important. In the case of Examples 5-7, the metal ions arranged with a nano-scale trough the self-assemblage of a block copolymer provide improved life characteristics more effectively. FIG. 5 shows an AFM image of the surface of the inhibiting layer prepared according to Example 5. It can be seen from FIG. 5 that metal ion-containing micelles form a pattern on the first solid electrolyte layer.

DESCRIPTION OF DRAWING NUMERALS

10: Solid-state battery
11: Current collector
12: Positive electrode
13: Solid electrolyte membrane
14: Negative electrode (lithium metal)
14a: Dendrite
130: Solid electrolyte membrane
131: Second solid electrolyte layer
132: Inhibiting layer
133: First solid electrolyte layer
200: Solid-state battery
210: Current collector
220: Positive electrode
231: Second solid electrolyte layer
232: Inhibiting layer
233: First solid electrolyte layer
240: Negative electrode (lithium metal)
241: Dendrite
330: Solid electrolyte membrane
331: Solid electrolyte layer
332: Inhibiting layer
430: Solid electrolyte membrane
431: Second solid electrolyte layer
433: First solid electrolyte layer
432: Inhibiting layer
432a: Micelle

What is claimed is:

1. A solid electrolyte membrane for a solid-state battery which has an ion conductivity of $1\times10^{-7}$ S/cm or more, and comprises at least one inhibiting layer comprising (a) a dendrite growth-inhibiting material,
wherein the dendrite growth-inhibiting material comprises (a1) at least one metal having a lower ionization tendency as compared to lithium, or (a2) at least one alloy comprising two or more metals having a lower ionization tendency as compared to lithium; and
further wherein the metal or the alloy is present in the inhibiting layer in the form of a salt thereof or ion thereof, and
wherein the solid electrolyte membrane comprises two or more solid electrolyte layers and one or more inhibiting layer, wherein the inhibiting layer is disposed between the solid electrolyte layers.

2. The solid electrolyte membrane for a solid-state battery according to claim 1, wherein the inhibiting layer is patterned with a plurality of pattern units comprising the dendrite growth-inhibiting material, and the pattern units are distributed regularly or randomly in the inhibiting layer.

3. The solid electrolyte membrane for a solid-state battery according to claim 2, wherein the inhibiting layer further comprises a copolymer to which the dendrite growth-inhibiting material is chemically bound, wherein the inhibiting layer has a micropattern derived from self-assemblage of the copolymer; wherein the copolymer comprises at least one functional group capable of being bound chemically with the dendrite growth-inhibiting material; and wherein the dendrite growth-inhibiting material is chemically bound with the copolymer by means of the functional group.

4. The solid electrolyte membrane for a solid-state battery according to claim 3, wherein the inhibiting layer has a shape comprising micelles aligned in a hexagonal close-packed structure by the self-assemblage of the copolymer.

5. The solid electrolyte membrane for a solid-state battery according to claim 3, wherein the at least one functional group is at least one of selected from the group consisting of an ether and an amine.

6. The solid electrolyte membrane for a solid-state battery according to claim 3, wherein the copolymer comprises at least one selected from the group consisting of polystyrene-block-poly(2-vinylpyridine) copolymer, polystyrene-block-poly(4-vinylpyridine) copolymer, poly(1,4-i soprene)-block-polystyrene-block-poly(2-vinylpyridine) copolymer and polystyrene-block-poly(ethylene oxide) copolymer.

7. The solid electrolyte membrane for a solid-state battery according to claim 1, wherein the metal comprises at least one selected from the group consisting of K, Sr, Ca, Na, Mg, Be, Al, Mn, Zn, Cr(+3), Fe, Cd, Co, Ni, Sn, Pb, Cu, Hg, Ag, Pd, Ir, Pt(+2), Au and Pt(+4).

8. The solid electrolyte membrane for a solid-state battery according to claim 1, wherein the dendrite growth-inhibiting material comprises at least one metal selected from the group consisting of Au and Pt.

9. The solid electrolyte membrane for a solid-state battery according to claim 1, wherein the metal is in the form of a salt, and wherein the salt comprises at least one selected from the group consisting of chloride, iodide, cyanide, bromide, sulfide, hydroxide, phosphite and chloride hydrate.

10. The solid electrolyte membrane for a solid-state battery according to claim 1, which comprises a first solid electrolyte layer, an inhibiting layer and a second solid electrolyte layer, stacked successively.

11. The solid electrolyte membrane for a solid-state battery according to claim 1, wherein at least one of the solid electrolyte layers comprises the dendrite growth-inhibiting material, and the content (wt %) of the dendrite growth-inhibiting material in each solid electrolyte layer is smaller than that of the dendrite growth-inhibiting material comprised in the inhibiting layer.

12. The solid electrolyte membrane for a solid-state battery according to claim 1, which further comprises an ion conductive solid electrolyte material, and the ion conductive solid electrolyte material comprises a polymeric solid electrolyte, an inorganic solid electrolyte or a mixture thereof.

13. The solid electrolyte membrane for a solid-state battery according to claim 12, wherein the polymeric solid electrolyte comprises a polymer resin and a solvated lithium salt.

14. An electrochemical device which is a solid-state battery comprising a negative electrode, a positive electrode and a solid electrolyte membrane according to claim 1, wherein the solid electrolyte membrane is interposed between the negative electrode and the positive electrode, and wherein the negative electrode comprises lithium metal.

15. The electrochemical device according to claim 14, wherein the solid electrolyte membrane comprises a first solid electrolyte layer, an inhibiting layer and a second solid electrolyte layer, stacked successively, wherein the first solid electrolyte layer comprises a dendrite growth-inhibiting material;

and further wherein the dendrite growth-inhibiting material comprises (a1) at least one metal having a lower ionization tendency as compared to lithium, or (a2) at least one alloy comprising two or more metals having a lower ionization tendency as compared to lithium.

* * * * *